Patented Apr. 21, 1931

1,801,661

UNITED STATES PATENT OFFICE

WILLIAM R. COLLINGS, OF MIDLAND, MICHIGAN, ASSIGNOR TO THE DOW CHEMICAL COMPANY, OF MIDLAND, MICHIGAN, A CORPORATION OF MICHIGAN

MAKING MAGNESIUM CHLORIDE FROM CHLORINE AND A MAGNESIUM BASE

Application filed October 4, 1928. Serial No. 310,229.

The present invention relates to methods of utilizing weak chlorine gas for the production of magnesium chloride from a magnesium base and particularly to the utilization of chlorine gas derived from the electrolysis of a fused chloride bath.

Chlorine gas derived by electrolysis in the manner above mentioned, e. g. from electrolysis of fused $MgCl_2$, may be largely diluted with air making it unfit for most uses for which a strong gas is preferred. It may also contain HCl and $CO_2$ in relatively considerable amounts and its economic disposition presents a problem in the chemical industry. The same problem is presented, generally, regarding the utilization of a weak chlorine gas.

I have found that such otherwise difficulty usable chlorine gas may be employed for the production of magnesium chloride chiefly, together with magnesium sulphate or epsom salts from a magnesium base, these products having a market value, and if the chlorine be derived from the electrolysis of magnesium chloride, the magnesium chloride may be concentrated, dehydrated and used in the electrolytic step.

To the accomplishment of the foregoing and related ends, the invention, then, consists of the method hereinafter fully described and particularly pointed out in the claims, the annexed drawing and the following description setting forth in detail several modes of carrying out the invention, such disclosed modes illustrating, however, but several of various ways in which the principle of the invention may be used.

Figure 1:
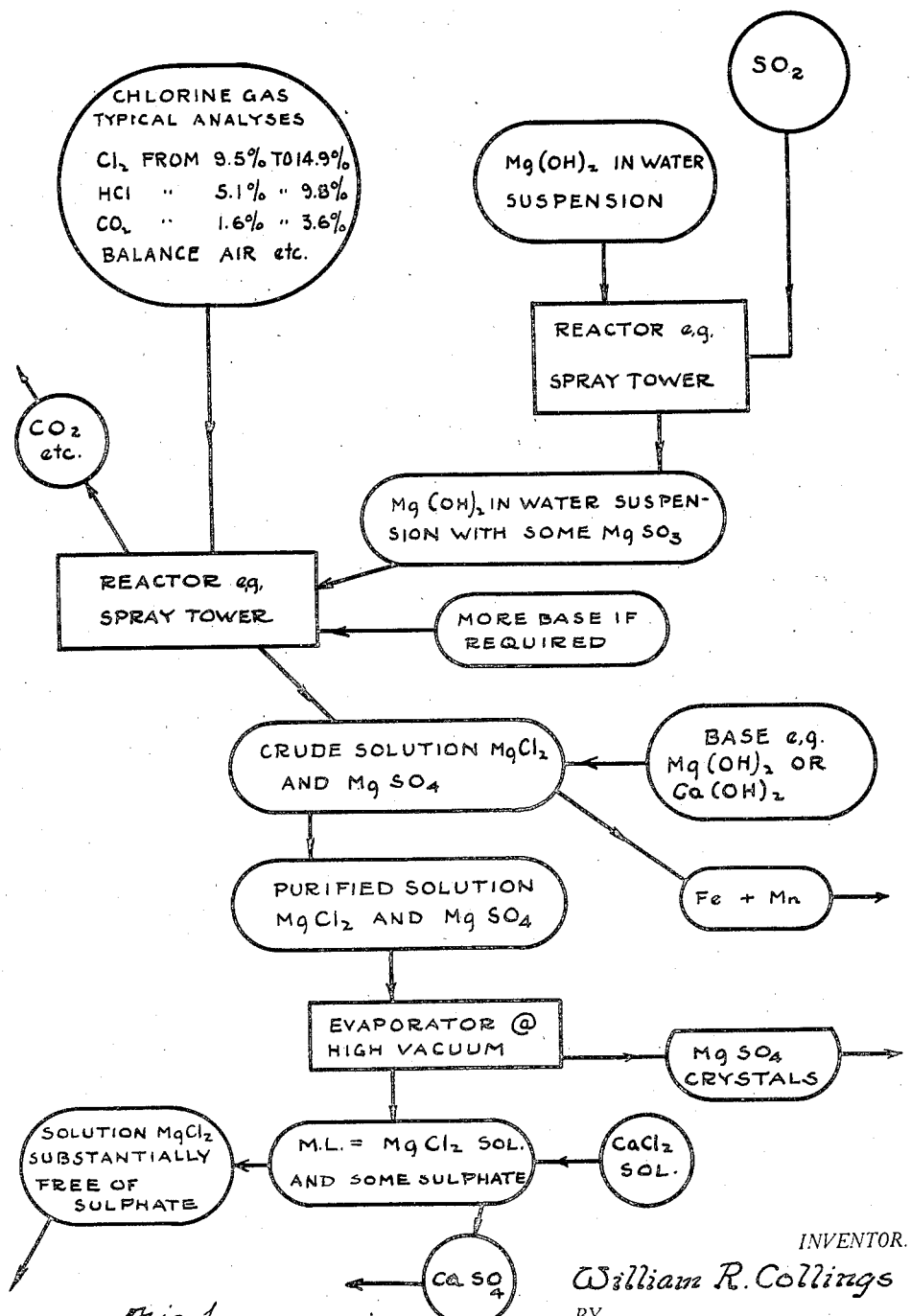
Figure 2:
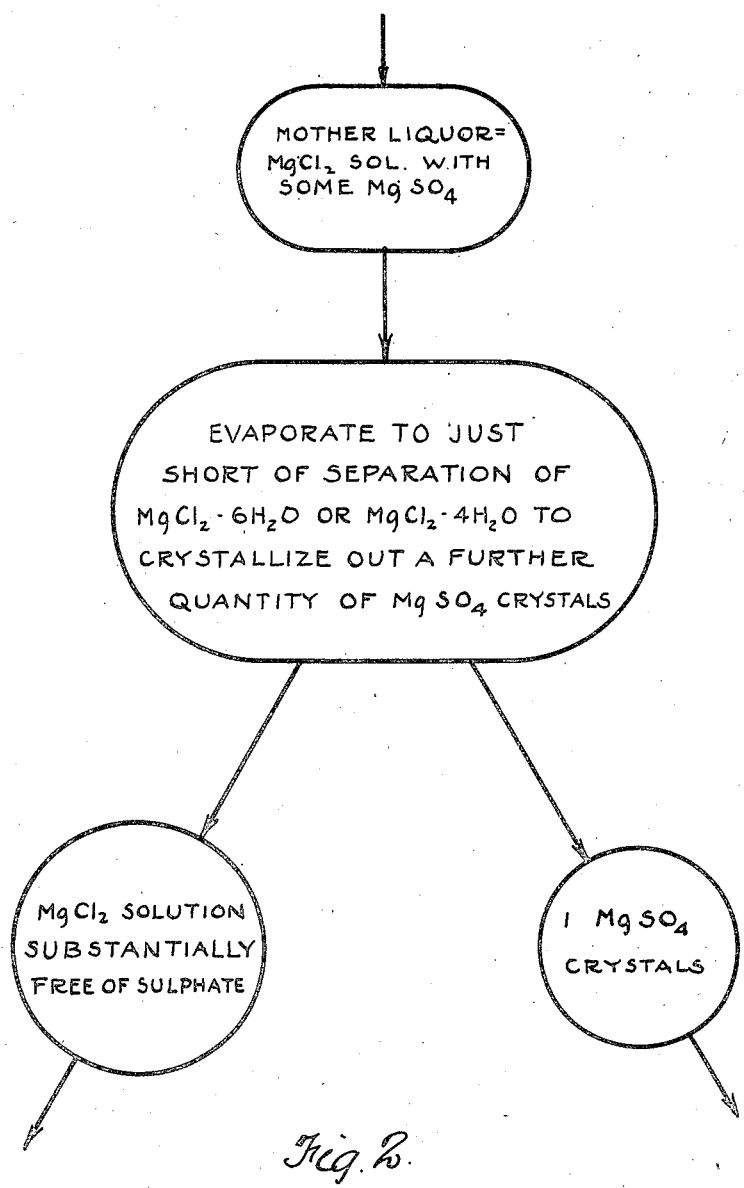

In said annexed drawing:

Figure 1 of the accompanying drawing presents in a general diagrammatic manner a flow sheet of the process and Figure 2 an alternative procedure applying to a part of Figure 1.

It has been proposed heretofore to absorb chlorine gas and sulphur dioxide gas together in magnesium hydroxide suspended in water to form a mixed solution of magnesium chloride and sulphate or to combine chlorine gas and sulphur dioxide in a water scrubber for the production of mixed hydrochloric and sulphuric acids and to then add a magnesium base to produce the same products. Such proposals have been found difficult of accomplishment since sulphuric anhydride is formed and escapes as fog with the unabsorbed diluent gas creating a nuisance or involving the installation and operation of expensive equipment to precipitate it. Proceeding, however, in the following described manner, no such difficulty is encountered.

I absorb $SO_2$ derived from the combustion of sulphur or otherwise in magnesium hydroxide in water suspension producing magnesium sulphite ($MgSO_3$), leaving the bulk of the hydroxide as an unreacted residue. I then absorb in this mixture the chlorine gas producing a solution of magnesium chloride and magnesium sulphate, the magnesium chloride being derived chiefly from the reaction of the chlorine, and the hydrochloric acid if any be present, on the magnesium hydroxide, the magnesium sulphite preventing the formation of hypochlorite or chlorate and itself being oxidized by the chlorine to sulphate. The absorption of $CO_2$ can be prevented by running the tower discharge slightly acid. I now treat the solution of magnesium chloride and magnesium sulphate with milk of lime or milk of magnesia in sufficient amount to precipitate iron and manganese, if present, as these impurities are usually present in sources from which the hydroxide may be derived. There then results, after separation, as by decantation, a solution containing magnesium sulphate and magnesium chloride free from iron and manganese. I then evaporate this solution preferably under high vacuum to precipitate magnesium sulphate crystals which are then eliminated, as by filtration, from the mother liquor remaining, said crystals constituting an impure product which may be later recrystallized for the production of a more satisfactory and marketable epsom salts. The remaining mother liquor, after separating the bulk of the sulphate, may then be treated in one of two ways to produce a solution of nearly pure magnesium chloride. One such method is shown in Figure 1 and consists in adding to the mother liquor a solution of calcium chloride which reacts with the magnesium sulphate remaining in the mother liquor precipitating calcium sulphate which is then separated by decantation or otherwise from the residual solution comprising then a magnesium chloride solution nearly free from sulphates. An alternative treatment of the mother liquor after separation of the bulk of the magnesium sulphate crystals is shown in Figure 2 which method comprises the concentration of the said mother liquor to a point short of separation therein of $MgCl_2.6H_2O$ or $MgCl_2.4H_2O$ whereupon crystals of $MgSO_4$ separate out. These crystals are then separated from the mother liquor as by filtration, or equivalent means, there then remaining a solution of magnesium chloride nearly free from sulphates.

The above methods avoid the production of $SO_3$ and the difficulty inherent to its fixation. It starts with relatively cheap raw materials, i. e., magnesium hydroxide and some $SO_2$, produces valuable products, i. e., magnesium chloride solution and a byproduct epsom salts, and affords a satisfactory method of using productively otherwise waste or difficultly usable chlorine gas.

In Figure 1 are given typical analyses of chlorine gas derived from the electrolysis of a fused $MgCl_2$ bath for production of magnesium metal where the chlorine is drawn off in a current of air and some water is present in the magnesium chloride fed to the cell, from which it will be seen that the gas not only contains chlorine but a substantial amount of HCl and a lesser amount of $CO_2$, the latter being derived from the oxidation of the graphitized carbon anodes. In operating the process the absorption of $SO_2$ in the magnesium hydroxide will be carried preferably to a point such that the proper proportion of sulphite to unreacted hydroxide suitable for the analysis of the chlorine gas available will be present in the reaction mixture. The process may be worked in continuous fashion or in batches but by working in batches it will be convenient to adjust the magnesium sulphite magnesium hydroxide content in the chlorination step to suit variations in the gas analysis so that there may result a solution in which the magnesium has all been converted to sulphate and chloride. This can be done by adding sulphite liquor from the $SO_2$ absorption step as required or magnesium hydroxide to the batch being chlorinated. Having obtained in this way a solution of magnesium sulphate and chloride of magnesium, the subsequent operations are readily accomplished.

If the magnesium chloride made is concentrated, the chloride crystallized out and dried for reuse in the cell, the method provides means for cycling the chlorine in the process and making magnesium metal from magnesium base such as magnesium hydroxide derived from magnesia or other source and provides further for the avoidance of the production of chlorates by employing magnesium sulphite as a reducer, there being produced an equivalent of sulphate of magnesia corresponding thereto.

If all of the sulphite is not converted to sulphate by reaction with the chlorine, as for instance, due to an initial excess thereof, the unreacted residue may be oxidized to sulphate with the air accompanying the chlorine or if sufficient air is not present the liquor containing the sulphite residue may be blown with air for the purpose or more air introduced with the chlorine than originally accompanied same, the oxygen content of the air combining with the sulphite, this reaction being already known to the art.

The action of the magnesium sulphite is to prevent formation of hydrochlorite or chlorate by the reaction of the chlorine on the suspended hydroxide. Such reducing agent, i. e., magnesium sulphite may be derived as indicated by absorbing $SO_2$ in magnesium hydroxide or may be otherwise derived and added in amount required. Other reducing agents capable of reacting in an equivalent manner may be employed, as for instance calcium sulphite, sodium sulphite, etc. Magnesium sulphite is, however, a convenient and preferred reducer.

A high magnesian lime or magnesia may be employed instead of magnesium hydroxide, the sulphur being eliminated as sulphate or sulphite of calcium, or the chlorine may be absorbed in magnesium sulphite in water suspension or magnesium acid sulphite liquor or in a mixture of the two. The acid condition resulting after conversion of the base to chloride may then be neutralized by adding more base, or again the chlorine may be absorbed in magnesium hydroxide in water suspension and the resulting magnesium chloride solution containing hypochlorite and/or chlorine may be treated with a reducer, but I prefer that the reducer be present in the chlorination step.

Other modes of applying the principle of my invention may be employed instead of the ones explained, change being made as regards the process herein disclosed, provided the step or steps stated by any of the following claims or the equivalent of such stated step or steps be employed.

I therefore particularly point out and distinctly claim as my invention:—

1. In a method of making magnesium chloride the step which consists in reacting chlorine upon magnesium hydroxide in water suspension in presence of a reducing agent.

2. In a method of making magnesium chloride the step which consists in reacting chlorine upon magnesium hydroxide in water suspension in presence of magnesium sulphite.

3. In a method of making magnesium chloride the steps which consist in reacting chlorine upon magnesium hydroxide in water suspension in presence of a reducing agent, separating from the resulting solution impurities including sulphur compounds leaving a purified solution of magnesium chloride.

4. In a method of making magnesium chloride the steps which consist in reacting chlorine upon magnesium hydroxide in water suspension in presence of a reducing agent, separating from the resulting solution impurities including sulphur compounds leaving a purified solution of magnesium chloride, crystallizing hydrated magnesium chloride therefrom and drying said chloride.

5. In a method of making magnesium and magnesium chloride the steps which consist in electrolyzing a fused bath thereof to produce magnesium metal and weak chlorine gas, reacting said gas with magnesium hydroxide in water suspension in presence of a reducing agent and purifying the resulting solution.

6. In a method of making magnesium and magnesium chloride the steps which consist in electrolyzing a fused bath thereof to produce magnesium metal and weak chlorine gas, reacting said gas with magnesium hydroxide in water suspension in presence of a reducing agent, purifying the resulting solution and preparing therefrom magnesium chloride for use in the first step.

7. The method of making magnesium chloride from chlorine and a magnesium base, which comprises the steps of reacting $SO_2$ upon magnesium hydroxide in water suspension to form a mixture of magnesium sulphite and magnesium hydroxide, treating said mixture in the presence of water with chlorine gas to make a solution of magnesium chloride and magnesium sulphate and separating the magnesium sulphate therefrom to obtain a solution of magnesium chloride.

8. The method of making magnesium chloride from chlorine and a magnesium base, which comprises the steps of reacting chlorine on magnesium hydroxide in water suspension in the presence of magnesium sulphite to form a solution of magnesium chloride and magnesium sulphate and separating the magnesium sulphate from said solution.

9. The method of making magnesium chloride from chlorine and a magnesium base, which comprises the steps of reacting chlorine on magnesium hydroxide in water suspension in the presence of magnesium sulphite to form a solution containing magnesium chloride and magnesium sulphate, treating the said solution with a base to remove iron and manganese, concentrating by evaporation the so purified solution under high vacuum to separate crystals of magnesium sulphate, separating the crystals so formed from the mother liquor, and eliminating the remaining sulphur content thereof, leaving a mother liquor comprising a solution of magnesium chloride substantially free from sulphur.

10. The method of making magnesium chloride from chlorine and a magnesium base, which comprises the steps of reacting chlorine on magnesium hydroxide in water suspension in the presence of magnesium sulphite to form a solution containing magnesium chloride and magnesium sulphate, treating the said solution with a base to remove iron and manganese, concentrating by evaporation the so purified solution under high vacuum to separate crystals of magnesium sulphate, separating the crystals so formed from the mother liquor, eliminating the remaining sulphur content thereof, leaving a mother liquor comprising a solution of magnesium chloride substantially free from sulphur, concentrating said purified solution to separate hydrated crystals of magnesium chloride and drying said crystals.

11. The method of making magnesium and magnesium chloride from chlorine and a magnesium base, which comprises the steps of electrolyzing a fused bath of magnesium chloride to produce magnesium metal and chlorine gas, drawing off the chlorine gas together with air and impurities and reacting said gas with magnesium hydroxide in water suspension in the presence of magnesium sulphite to form a solution containing magnesium chloride and magnesium sulphate, separating the magnesium chloride from the magnesium sulphate and drying the magnesium chloride so separated for use as feed to the fused bath.

12. The method of making magnesium chloride from chlorine and a magnesium base, which comprises the steps of electrolyzing fused magnesium chloride for the production of magnesium metal and weak chlorine gas, reacting said gas with magnesium hydroxide in water suspension in the presence of magnesium sulphite to form a solution containing magnesium chloride and magnesium sulphate, purifying said solution by treatment with a base, evaporating the so purified solution to separate magnesium sulphate crystals, treating the mother liquor to remove further sulphate therefrom leaving a solution of magnesium chloride substantially free of sulphur, crystallizing therefrom hydrated magnesium chloride, drying said hydrated chloride and using the so dried chloride as feed to the fused bath electrolytic step.

13. In a method of making magnesium and magnesium metal from magnesium chloride involving the electrolysis of a fused bath thereof, the steps which consist in reacting the weak chlorine so obtained with magnesium hydroxide in water suspension in the presence of magnesium sulphite to form a solution containing magnesium chloride and magnesium sulphate, separating the sulphate and other impurities from said solution to obtain a solution of magnesium chloride substantially free of sulphate, crystallizing hydrated magnesium chloride therefrom, drying said chloride and feeding same to the electrolytic step whereby the chlorine is cycled in the process.

Signed by me this 24th day of September, 1928.

WILLIAM R. COLLINGS.